Figure 3:
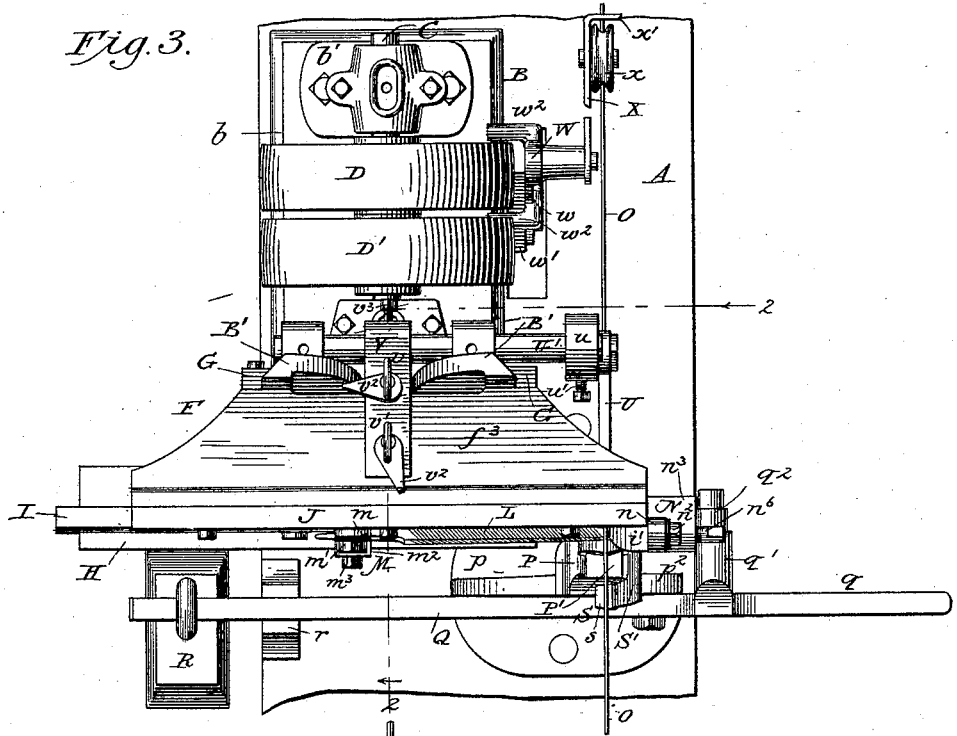

No. 679,748. Patented Aug. 6, 1901.
J. E. HILLSTROM.
SAW FILING MACHINE.
(Application filed May 11, 1901.)
(No Model.) 3 Sheets—Sheet 1.
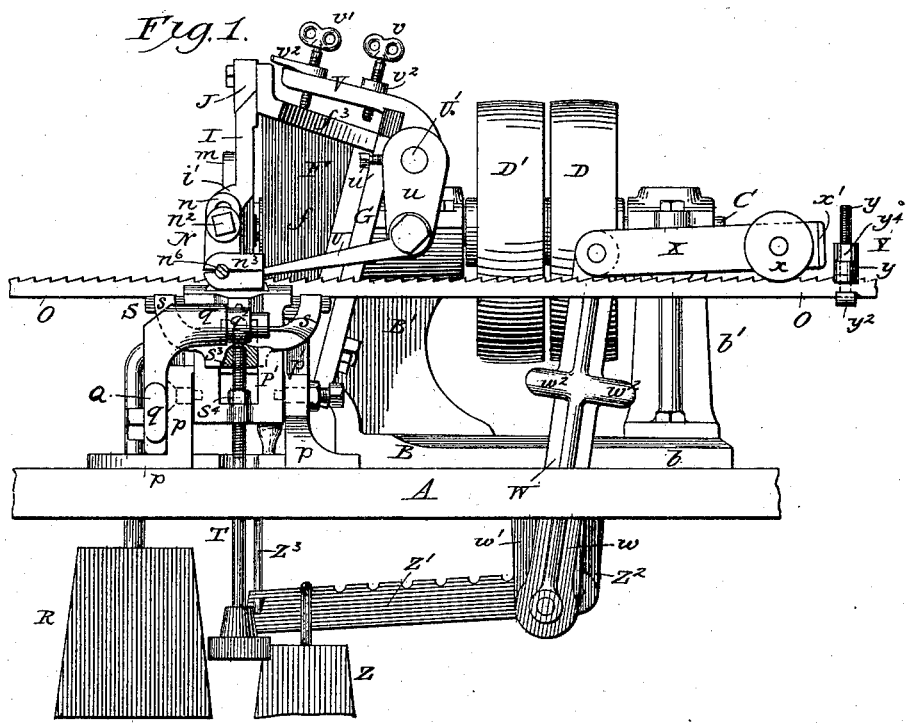
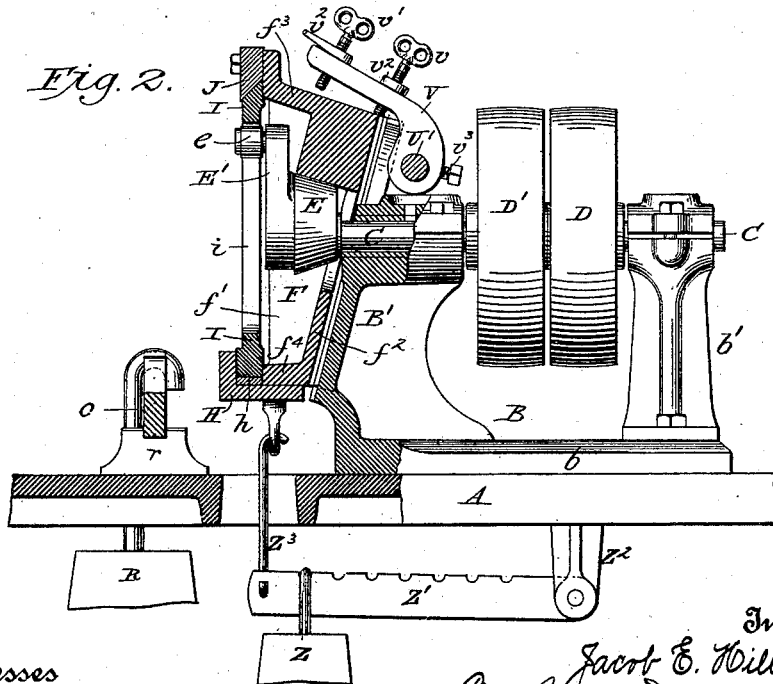
Witnesses
A. M. Parkins.
E. A. Balloch
Inventor
Jacob E. Hillstrom,
By Baldwin, Davidson & Wight
Attorneys
THE NORRIS PETERS CO., PHOTO-LITHO., WASHINGTON, D. C.

No. 679,748. Patented Aug. 6, 1901.
J. E. HILLSTROM.
SAW FILING MACHINE.
(Application filed May 11, 1901.)

(No Model.) 3 Sheets—Sheet 2.

Witnesses
A. M. Parkins.
E. A. Bulloch.

Inventor
Jacob E. Hillstrom,
By Baldwin, Davidson & Wight.
Attorneys

THE NORRIS PETERS CO., PHOTO-LITHO., WASHINGTON, D. C.

No. 679,748. Patented Aug. 6, 1901.
J. E. HILLSTROM.
SAW FILING MACHINE.
(Application filed May 11, 1901.)
(No Model.) 3 Sheets—Sheet 3.

Witnesses
A. M. Parkins.
E. A. Balloch.

Inventor
Jacob E. Hillstrom
By Baldwin, Davidson & Wight
Attorneys

UNITED STATES PATENT OFFICE.

JACOB E. HILLSTROM, OF MICHIGAN CITY, INDIANA.

SAW-FILING MACHINE.

SPECIFICATION forming part of Letters Patent No. 679,748, dated August 6, 1901.

Application filed May 11, 1901. Serial No. 59,758. (No model.)

*To all whom it may concern:*

Be it known that I, JACOB E. HILLSTROM, a citizen of the United States, residing at Michigan City, in the county of Laporte and State of Indiana, have invented certain new and useful Improvements in Saw-Filing Machines, of which the following is a specification.

My invention relates particularly to machines for filing or sharpening band-saws of the class in which the saw is supported and guided by pulleys and fed forward step by step under a reciprocating file by means of a pawl operated to feed the saw one tooth at a time past the file, which latter is moved out of engagement with the saw during its backward movement, at which time the saw is advanced. In such machines the saw is usually held beneath the file by a vise, which while holding the saw with sufficient firmness to withstand the pressure of the file allows the saw to be advanced at the proper times.

The objects of my invention are to provide, first, improved means for holding the saw in place under the file; second, improved means for feeding the saw past the file; third, improved means for reciprocating the file and giving it an up-and-down movement to cause it to alternately engage the saw and to recede therefrom; fourth, improved means for stopping the operation of the machine when a saw has been completely filed or sharpened, and, fifth, improvements in the details of construction of some of the parts, all of which will be hereinafter fully described.

In carrying out my invention I provide a vise or clamp for holding the saw, which has one of its jaws stationary and the other pivoted and provided with a weighted arm or lever, which causes a constant pressure to be exerted on the saw while being filed and also while being fed, but which allows the saw to advance at proper times. The saw is advanced by a pawl which engages the saw-teeth and which is operated by a system of levers, one of which carries one or more set-screws or similar devices operated upon by an inclined surface forming part of a vertically-moving frame to which the file is connected. This frame is moved vertically in suitable guides by a cam on the driving-shaft, and a plate carried by the frame is moved horizontally by a crank on the same shaft engaging a vertical slot in the plate. The shaft carries fast and loose pulleys, and a belt-shifter is provided, which is operated by a stop secured to the saw. The stop is made to abut against the end of an arm of the belt-shifter, and the arm carries a wheel, which is preferably made of wood or other similar material adapted to hold oil, which is supplied from the wheel to the saw as the saw passes by it. The devices for operating the feed-pawl may be adjusted to properly feed different sizes of saws, and the file may also be adjusted and may be readily removed and replaced. The file is moved downwardly by a weight connected to the file-carrying frame, and this weight draws the frame down to a predetermined extent at each operation, the downward movement being limited by a stop, by which organization the file is made to cut the saw-teeth to the same depth at each operation, and hence a perfectly regular filing of the saw is insured.

Figure 4:
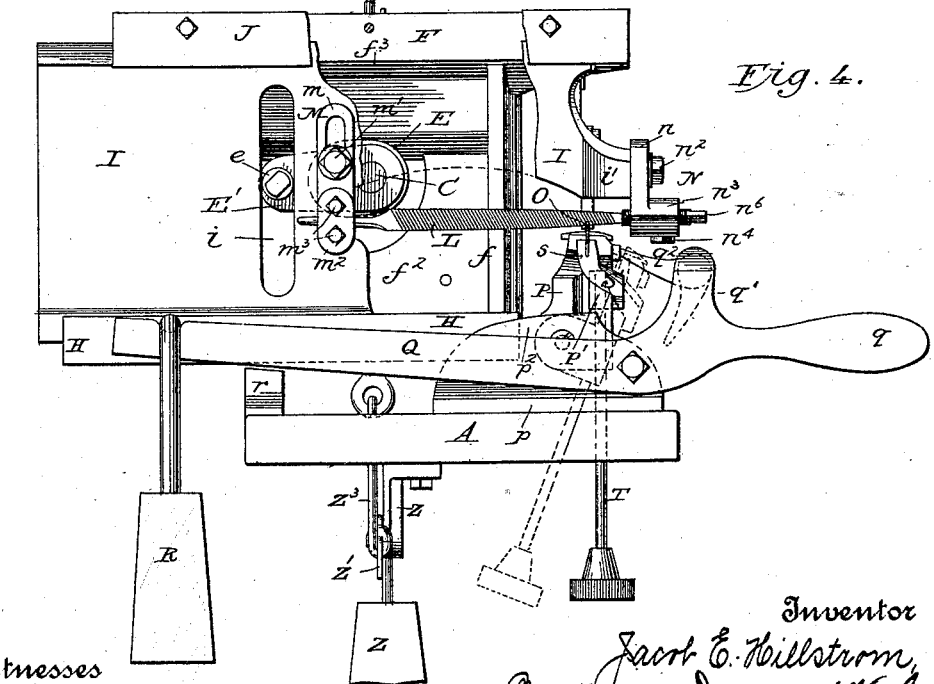
Figure 5:
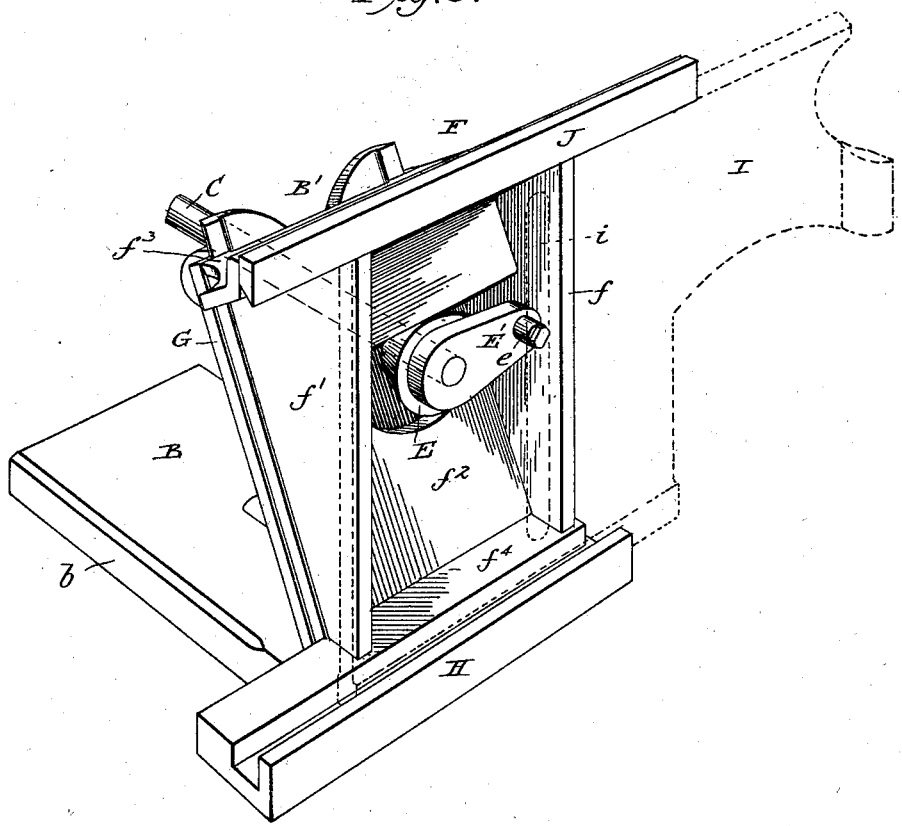
Figure 6:
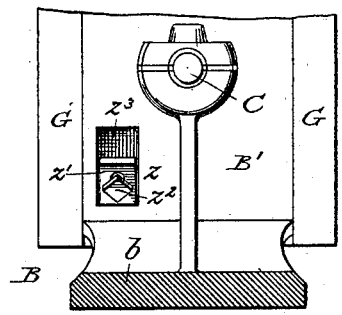
Figure 7:
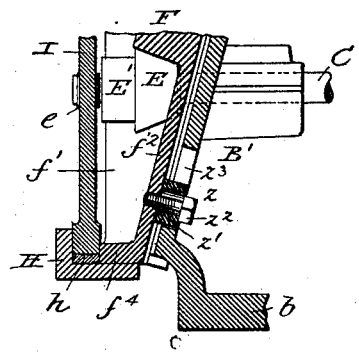

In the accompanying drawings, illustrating my invention, Figure 1 is a front elevation of so much of a saw-filing machine embodying my improvements as is necessary to illustrate the manner of carrying out my invention. Fig. 2 shows a transverse section on the line 2 2 of Fig. 3, some of the parts being shown in section and some in elevation. Fig. 3 shows a top plan view of the mechanism. Fig. 4 shows a left side elevation thereof, some of the parts being broken away in order better to illustrate other parts. Fig. 5 is a detail view, on an enlarged scale, illustrating particularly the mechanism for giving a compound movement to the file—namely, a reciprocating and an up-and-down movement, the latter being slightly inclined. Fig. 6 is a detail view showing particularly the stop and parts connected therewith for limiting the downward movement of the file-carrying frame. Fig. 7 shows a section of the same on the line 7 7 of Fig. 6.

The bed A of the machine may be supported on any suitable standards which will elevate it sufficiently to afford room for the parts of the mechanism below the bed. Secured to the bed is a casting B, comprising a base-plate $b$, resting on the bed A, a standard $b'$ for supporting one end of the driving-shaft C, and a standard B' for supporting the other end of the shaft. The standard B' is also formed to guide the vertically-moving frame, to which the file is connected in the manner hereinafter described. The shaft C carries fast and loose pulleys D D' and also a cam E and a crank-arm E', provided with a roller $e$ for the purpose hereinafter stated.

F indicates a vertically-moving frame consisting of front and rear portions $f f'$, a side portion $f^2$, and top and bottom portions $f^3 f^4$. The side portion $f^2$ has secured to it rails G, that fit the guide portion of the standard B', the arrangement being such that the frame F may move vertically in an inclined direction on the inclined guide-standard. The cam E bears against a horizontal surface of the frame F, below the top thereof, and as the cam is revolved the frame is moved upwardly in a diagonal or inclined direction. The surface of the cam, it will be observed, is slightly inclined, and it bears on a correspondingly-inclined surface on the frame F. An L-shaped guide-rail H is secured to the lower end of the frame F and provides a guide for the lower end of the reciprocating file-carrying plate I. The upper edge of this plate is guided by a rail J, secured to the upper part of the frame F. This rail is removable, and when removed the plate I may be withdrawn. I preferably employ a wearing-strip $h$ in the guide for the lower edge of the plate I. This plate is provided with a vertical slot $i$, in which works the roller $e$ on the crank-arm E'. The arrangement is such that as the shaft C revolves the frame F is moved upwardly in an inclined direction and the plate I is reciprocated transversely to the driving-shaft in the frame F and is moved up and down therewith. This construction and operation is clearly indicated in Fig. 5.

The file L is supported in a horizontal position by supporting devices M N. These may be of any suitable construction. As shown, one end of the file is supported by the device M, consisting of a slotted plate $m$ adjustably secured to the plate I by a set-screw $m'$ and carrying at its lower end a clamp-block $m^2$, held by screws $m^3$. The opposite end of the file is held by the device N, consisting of a slotted hanger $n$, adjustably secured to the arm $i'$ of the plate I by a set-screw $n^2$, and a clamp-block $n^3$, held by a set-screw $n^4$. A screw $n^6$, operating in the clamping device N in line with the axis of the file, is used for adjusting the file fore and aft. By these devices the file may be adjusted in any desired way to accommodate the work to be performed.

The saw O may be guided by pulleys at opposite ends in the usual way, and it is held in place beneath the file by a vise, comprising a stationary jaw P and a movable jaw P'. The stationary jaw projects upwardly from a base $p$, secured to the bed A. The base is formed with standards $p'$, between which is arranged the movable jaw P', and the movable jaw is pivoted to the standards, as shown in Fig. 1. The base $p$ is also formed with a bracket $p^2$, to which is pivoted a lever Q, carrying on its rear end a weight R, having at its front end a handle $q'$ and being formed in rear of the handle with an ear $q$, to which is pivoted a dog $q^2$, that bears against the upper end of the jaw P'. The connection between the dog $q^2$ and the jaw P' is a loose one, so that the dog may be disconnected from the jaw in the manner indicated by dotted lines in Fig. 4. Normally, however, the dog is in engagement with the jaw P' and holds the upper end of said jaw in an elevated position in such manner as to press it toward the stationary jaw. Between the two jaws is interposed a rest S, on which the back edge of the saw bears. This rest consists of a thin plate attached to the arms $s$ of a vertically-moving yoke S', which is formed with a projection entering a rectangular slot $s^2$ in the jaw P', by which means the yoke is guided. A rod T, extending through the bed A and through the base $p$ freely, also extends freely through an unthreaded opening in the lower end of the jaw P', and it has a bearing at its upper end in the upper portion of said jaw. The rod is threaded, as indicated, and extends into a threaded opening $s^3$ in the yoke S'. A nut $s^4$ on the screw-rod bears upon the lower wall of the rectangular opening in the jaw P', as indicated. The arrangement is such that the yoke may be adjusted vertically with reference to the jaws of the vise, so as to accommodate saws of different sizes. The yoke, it will be observed, is carried by the pivoted or movable member of the vise, and when the dog $q^2$ is detached the yoke swings forward with the jaw P' in the manner indicated in Fig. 4. The saw is arranged between the jaws of the vise, and the rest S is properly adjusted to cause the teeth to stand at a proper elevation relatively to the file, which may also be adjusted relatively to the saw. The saw may be placed in position in the vise by bearing down upon the handle $q$ of the lever Q, thus lifting the weight R, but allowing the pivoted jaw P' to open forwardly. After the saw is placed properly in position the pressure on the lever Q may be relieved and then the jaw P' will be made to press the saw firmly against the stationary member of the vise. It is sometimes desirable to open the pivoted jaw to a considerable extent, and when this is so the dog $q^2$ may be disengaged from the jaw, when the latter by its own weight will open to its full extent; but the lever Q is prevented from moving downwardly to any great extent by means of a stop $r$, secured to the bed A under the rear end of the lever. It is very desirable to use such a stop, inasmuch as the weight R is quite heavy and only a slight movement of the lever Q is necessary in opening and closing the vise.

It will be observed that the pressure exerted on the saw by the vise is a constant one, both while the saw is being filed and while it is being advanced. The pressure is sufficient to hold the saw with sufficient firmness to resist the pressure of the file; but the pressure is not so great as to prevent the saw from being advanced. This mode of operation differs from those saw-filing machines in which the movable jaw of the vise is entirely withdrawn from the saw when the latter is being advanced.

In order to feed the saw forward step by step, I employ a pawl U, which is pivoted to a crank-arm $u$ on a shaft U′, mounted in bearings on the guide portion of the standard B′. The connection between the crank-arm and the shaft U′ may be adjusted by a set-screw $u'$ to vary the movement of the pawl. The shaft U is provided with an arm or a lever V, projecting over the top of the vertically-moving frame F and carrying set-screws $v\ v'$, adapted to bear on the inclined top of the frame F. Lock-nuts $v^2$ are employed to tighten the screws when adjusted. The arm or lever V may be adjusted on the shaft U′ by means of a set-screw $v^3$. All of the adjustments referred to may be employed to properly regulate the movement of the pawl to feed the saw at the proper time and to the proper extent relatively to the movement of the file.

In order to stop the machine when a saw is completely filed or sharpened, I employ a belt-shifter W, comprising a lever $w$, pivoted to a bracket $w'$, depending from the bed A and projecting upwardly through an opening in the bed, above which it is provided with arms $w^2$, adapted to engage the belt. The lever is prolonged to a point above the plane of the saw, at which end it is pivotally connected with a rod X, projecting horizontally to the right, as seen in Fig. 1, and carrying on its end a pulley $x$, which is preferably grooved and bears upon the top of the saw. This belt-shifter is operated by a stop Y, which may be of any suitable construction, but which preferably consists of a screw-threaded rod $y$, having a headed lower end $y^2$ and carrying a loose sleeve $y^3$ and a nut $y^4$. The stop thus constructed may be readily clamped to the saw at the proper position, so that when the saw is completely filed the stop strikes against the end $x'$ of the rod X and moves the rod and belt-shifting lever connected therewith to the left in such a manner as to shift the belt from the fast pulley D to the loose pulley D′. The wheel $x$ is preferably made of wood which will carry a certain amount of oil and supply it to the teeth of the saw as the saw passes under it. I find that by oiling the saw in this way just before being filed the operation of filing is materially improved.

The downward movement of the frame F is effected partly by its own weight, but mainly by a weight Z, carried by a lever Z′, pivoted to a bracket Z$^2$, depending from the bed A. The weight may be adjusted in the notches on the lever to vary the downward pull on the frame. The weighted lever Z′ is connected by means of a link Z$^3$ with the frame F, and this link may be readily detached whenever desired. The downward movement of the frame is limited by a stop $z$. (Indicated particularly in Figs. 6 and 7.) This stop is shown as consisting of a slotted block $z'$, attached to the frame F by a set-screw $z^2$. The block extends into a vertical slot $z^3$, formed in the guide portion of the standard B′. The slot in the block $z'$ is sufficiently long to permit the block to be adjusted vertically a sufficient distance to accommodate saws of different sizes. By this means the downward movement of the frame F is regulated. It will be remembered that the frame is moved upwardly by the cam E on the driving-shaft C and that it is moved downwardly by the weighted lever Z′. The stop determines the extent to which the frame F shall be lowered, and hence the extent to which the file shall be lowered when operating upon the saw.

The general operation of the machine is as follows: The saw is grasped by the vise and is held at the proper elevation by the rest S, and the pawl engages the teeth of the saw while the wheel $x$ rests on the saw in the manner indicated in Fig. 1. Motion being imparted to the driving-shaft, the frame F is raised at proper times by the cam E, and the plate I is reciprocated back and forth. These movements cause the file to move back and forth and up and down, so as to properly file the teeth in the saw. The organization is such that the plate I is moved forward with the saw while the frame F is at rest. Thus during the forward movement of the plate the file is held in engagement with the saw and files a tooth. As soon as the plate I has reached the limit of its forward movement the cam E comes into engagement with the frame F and during the backward movement of the plate I causes the frame F and the plate I, connected therewith, to be raised and also moved in an inclined direction in such manner as to free the file from the teeth of the saw and also move it upwardly therefrom. When the file is moving forwardly in engagement with the saw, the frame F being stationary, no movement is imparted to the feed-pawl U, but the pawl is caused to move to the left in such manner as to advance the saw while the file is moving backwardly by the upward movement of the frame F, which, acting on the set-screws $v\ v'$ causes the shaft U′ to be rocked and impart a proper movement to the pawl. The downward movement of the frame F causes the pawl to move to the right and engage a new tooth at each operation. These movements continue until the band-saw is completely filed or until the stop Y engages the end of the rod X and operates the belt-shifter to transfer the belt from the fast to the loose pulley.

One of the chief merits of my improved machine is its simplicity. Saw-filing machines have heretofore been employed in which the saw has been fed forwardly step by step by a feed-pawl engaging the saw and the file reciprocated in a straight line when in engagement with the saw and moved out of engagement with the saw during the feeding operation; but all such machines with which I am familiar have differed materially in construction from my machine. It will be observed that the mechanism which I employ for giving the proper movement to the file is very simple and strong, the frame being moved vertically by a cam and the plate being moved horizontally by a crank on the same shaft with the cam, while the feed-pawl is operated by the frame during its upward movement. I am not aware of any machine which accomplishes the necessary operation by such simple mechanism.

I claim as my invention—

1. In a saw-filing machine, the combination with the stationary and movable jaws of the vise, of a pivoted lever carrying a weight and having a handle, and a dog pivoted to the lever and engaging the movable jaw of the vise.

2. In a saw-filing machine, the combination of the stationary and movable jaws of the vise, of a pivoted lever, a weight carried by the lever, connections between the lever and the movable jaw, a handle and a stop arranged beneath the weighted end of the lever.

3. In a saw-filing machine, the combination of a vise for holding the saw, a feed-pawl, a vertically-moving frame to which the file is attached, and connections between this frame and the feed-pawl whereby the latter is operated.

4. The combination of the vertically-moving frame to which the file is attached, the feed-pawl, the rock-shaft to which it is connected, and an arm projecting from the rock-shaft carrying devices against which the frame bears when moving upwardly to withdraw the file from the saw.

5. The combination of the vertically-moving frame to which the file is attached, the feed-pawl, the rock-shaft to which it is connected, the arm or lever projecting from the rock-shaft, and set-screws carried by this arm against which the vertically-moving frame bears when moving upwardly to cause the pawl to feed the saw.

6. The combination of the vertically-moving frame to which the file is attached, means for moving the frame upwardly, an adjustable stop for limiting the downward movement of the frame, and a weight attached to the frame for moving it downward.

7. The combination of the vertically-moving frame, a plate carried thereby to which the file is attached, a driving-shaft, a cam thereon engaging directly the vertically-moving frame to move it upward, and a crank-arm on said shaft extending into a slot in the plate to reciprocate it in guides on the vertically-moving frame.

8. The combination of the vertically-moving frame, the plate carried thereby to which the file is attached, a driving-shaft, a cam thereon engaging the vertically-moving frame to move it upward, a weight for moving the frame downward, an adjustable stop for limiting the downward movement of the frame, and a crank-arm on the driving-shaft engaging a slotted portion of the file-carrying plate.

9. The combination in a saw-filing machine, of the driving-shaft and the fast and loose pulleys, of a belt-shifter comprising a shifting-lever having arms engaging the belt, a rod pivoted to the upper end thereof, and a wheel on the end of the rod adapted to bear on the saw for the purpose specified.

10. The combination in a saw-filing machine, of the driving-shaft, the fast and loose pulleys, the belt-shifting lever having arms for engaging the belt, a rod pivotally connected with the upper end of the lever, a wooden wheel carried by the arm and adapted to rest upon and supply oil to the saw, and a stop carried by the saw for operating the belt-shifter.

In testimony whereof I have hereunto subscribed my name.

JACOB E. HILLSTROM.

Witnesses:
CHARLES H. PURDY,
BENJ. F. LEGGETT.